United States Patent
Molinari (10) Patent No.: US 9,230,071 B2
(45) Date of Patent: Jan. 5, 2016

(54) METHOD FOR PROTECTING AN APPLICATION PROGRAM

(71) Applicant: STMICROELECTRONICS S.R.L., Agrate Brianza (MB) (IT)

(72) Inventor: Ubaldo Molinari, Naples (IT)

(73) Assignee: STMICROELECTRONICS S.R.L., Agrate Brianza (MB) (IT)

(*) Notice: Subject to any disclaimer, the term of this patent is extended or adjusted under 35 U.S.C. 154(b) by 46 days.

(21) Appl. No.: 13/852,418

(22) Filed: Mar. 28, 2013

(65) Prior Publication Data

US 2013/0269036 A1    Oct. 10, 2013

(30) Foreign Application Priority Data

Apr. 5, 2012  (IT) ................ MI2012A0561

(51) Int. Cl.
| | |
|---|---|
| *G06F 21/00* | (2013.01) |
| *G06F 21/14* | (2013.01) |
| *G06F 21/10* | (2013.01) |
| *H04L 29/06* | (2006.01) |
| *G06F 21/12* | (2013.01) |

(52) U.S. Cl.
CPC .............. *G06F 21/14* (2013.01); *G06F 21/10* (2013.01); *G06F 21/123* (2013.01); *G06F 21/128* (2013.01); *H04L 63/0428* (2013.01)

(58) Field of Classification Search
CPC ....... G06F 21/10; G06F 21/123; G06F 21/14; G06F 21/128; H04L 63/0428
USPC ............................................. 726/26
See application file for complete search history.

(56) References Cited

U.S. PATENT DOCUMENTS

| | | | | |
|---|---|---|---|---|
| 5,892,900 | A * | 4/1999 | Ginter et al. ............ | 726/26 |
| 5,893,118 | A | 4/1999 | Sonderegger | |
| 6,078,747 | A * | 6/2000 | Jewitt ............ | 717/164 |
| 6,944,650 | B1 * | 9/2005 | Urien ............ | 709/217 |
| 7,418,717 | B1 * | 8/2008 | Dolske et al. ............ | 719/328 |
| 8,032,605 | B2 * | 10/2011 | Brown et al. ............ | 709/208 |
| 8,196,131 | B1 * | 6/2012 | von Behren et al. ............ | 717/168 |
| 2002/0083142 | A1 * | 6/2002 | Lagosanto et al. ............ | 709/207 |
| 2003/0177392 | A1 * | 9/2003 | Hiltgen ............ | 713/201 |
| 2004/0122774 | A1 * | 6/2004 | Studd et al. ............ | 705/65 |
| 2005/0138387 | A1 | 6/2005 | Lam et al. | |
| 2007/0164118 | A1 * | 7/2007 | Degauque et al. ............ | 235/492 |
| 2008/0115117 | A1 * | 5/2008 | Wilkinson et al. ............ | 717/139 |
| 2010/0134274 | A1 * | 6/2010 | Singh et al. ............ | 340/539.11 |
| 2010/0248787 | A1 * | 9/2010 | Smuga et al. ............ | 455/566 |
| 2013/0090066 | A1 * | 4/2013 | Marseille et al. ............ | 455/41.2 |

FOREIGN PATENT DOCUMENTS

| | | |
|---|---|---|
| EP | 1 253 503 | 10/2002 |
| WO | 97/03398 | 1/1997 |

* cited by examiner

*Primary Examiner* — Mohammad A Siddiqi
(74) *Attorney, Agent, or Firm* — Allen, Dyer, Doppelt, Milbrath & Gilchrist, P.A.

(57) ABSTRACT

An application program providing a task in an electronic device is protected. Information used for executing the task in the electronic device is stored in a smart object to be coupled thereto. The information is requested from the smart object at run time execution of the application program by the electronic device, and is returned to the application program to define at run time a correct semantic of the task.

26 Claims, 6 Drawing Sheets

```
String className, methodName, paramNum;

data = getInfo("SUM");
retriveAtomicElements(data, className, methodName, paramNum);

// Calling a method to send an inquiry to a Smart object (SIM card) for receiving
information associated with the function is done, and received data is parsed.
// For example, the variable className, methodName, paramNum gets to
include the following values
// className  ← "Summatory"
// methodName  ← "Add"
// paramNum <- 2 try {
    Class cl = Class.forName(className);
    Object obj = cl.newInstancse();
    MyClass x = ( MyClass) obj;
    Method m = cl.getMethod(methodName, new Class(){});
    if (paramNum == 2) SUM= m.invoke(this, a,b);
} catch (Exception e) {
    e.printStackTrace();
}
```

FIG. 4B

METHOD FOR PROTECTING AN APPLICATION PROGRAM

FIELD OF THE INVENTION

The present invention relates to a method for protecting an application program in an electronic device. More particularly, the invention relates to a method of the type described above for limiting the use of the application program and protecting copyright of the application program.

BACKGROUND OF THE INVENTION

One method for protecting an application program includes using a serial number for activation, which is requested during a setup of the application program. This method has some drawbacks, including that the serial number may be copied, intercepted or calculated.

Another method for protecting an application program includes using an activation procedure after installing the program. For example, at a first execution, the application program requires a registration to a web site of a producer or seller and, after registration, an additional activation code is sent via email or phone to a user. The insertion of the additional activation code in the application program allows the program to be used. However, the additional activation code may also be intercepted and recalculated, and thus this method is not secure.

Moreover, in the method described above, once the application program has been installed in a device and registered, it is permanently stored in the memory of the device in executable format. Thus, it is subject to copy or reverse engineering to retrieve the source code. In some cases, the application program in executable form may be copied into a memory of another device and executed therein.

A further method for protecting application programs is based on a dongle or hardware key inserted in a physical port of a device executing the application program. In absence of the dongle or hardware key, the application program cannot be executed. However, the dangle may be duplicated and a duplicated dongle may be used to unlock an application program in other devices. Moreover, dongles are expensive because they are designed for specific purpose devices and for specific hardware configurations.

Yet a further method for protecting software is based on an integrated circuit card (ICC). For example, EP 1,253,503 discloses a method for protecting a source code [X=Y+10]. The method provides a different encoding [X:=Y+(C−T), where C:=decrypt(g(10)+t)] of the source code, including an encrypted parameter [g(10)] and a variable returned from a smartcard [T]. The different encoding of the source code [X:=Y+(C−T)] may be reconstructed only through the smart card [(X:=Y+(10+T−T)→Y+10)]. However, also in this case, when the application program is executed in the device, the memory of the device may be copied to reverse engineer the source code (X:=Y+(C−T)).

SUMMARY OF THE INVENTION

An object of the present invention is to provide a method for protecting an application program which is effective also when the application is loaded in the memory of a device for execution. This is to prevent copying of an image of the memory during execution of the application program. For example, reverse engineering to retrieve the source code of the application program or copying the source code as it is into another device to be executed are to be avoided since these limitations currently affect the copyright of application programs and their control after being installed.

An application program may thus be provided for an electronic device, where the application program includes program codes for defining a task to be performed, and wherein execution of the application program to perform the task may be stopped at least one time for requesting information to a smart object that is necessary to define the task through the program codes. The smart object may be connected to the electronic device, and includes an encryption key for an encrypted transmission of the information with the electronic device.

Advantageously, all the elements necessary to define the task, i.e., the program codes, are included in the application program itself but the semantic of the task is defined only at run time. This is when the smart object returns the information necessary to use or combine the program codes for the definition of the task.

In other words, the application program is intended to execute one task in the electronic device and the task in not again defined or not completely defined during execution of the application but only after requesting information on the task to be executed from the application program to the smart object connected thereto. The information may be returned at run time to the electronic device, and is used for define or complete the definition of the task and executing it. Thus, even if the definition of the task is included in the electronic device as program codes, such program codes are built together for the definition of the semantic of the task only at run time of the application program, when the smart object returns the information. The smart object may be, for example, an IC Card or a smart card or a SIM card connectable to the electronic device.

Advantageously, whether or not the smart object is connected to the electronic device, the task cannot be performed and the electronic device cannot be inspected to retrieve the definition of the task since the program codes are not built together for defining the task. More executions of the task involve more requests of information to the smart object, regarding the same task, since the information is necessary for any execution of the task in the electronic device.

In one aspect, the definition of the task may be completely stored in the application program but the definition stored is not usable to correctly or completely perform the task. This is whether or not the required information is received from the smart object. Advantageously, according to this aspect, the smart object may store only some information indispensable for the definition and execution of the task. This information may be limited in size to reduce the time required to communicate from the smart object to the electronic device during execution of the application.

The technical problem may thus be addressed by a method for protecting an application program providing at least one task in an electronic device, characterized by the fact that information necessary for executing the task in the electronic device may be stored in a smart object connected thereto. The information may be requested by the smart object at run time execution of the application program in the electronic device, and may be processed by the application program to define at run time a correct semantic of the task.

Advantageously, the application program may be correctly compiled since its code, including a code associated to the task, is syntactically correct, and can also be correctly executed. However, when the task is requested, the application program cannot perform it or perform it entirely, since it does not define the semantic of the task, i.e., the operations or function to be executed by the task. Such a semantic of the task may be constructed only after receiving the associated information from the smart object.

Advantageously, whether the memory of the executable application is copied or whether the application program is inspected during execution, it is not possible to retrieve the semantic of the task and the source or program code implementing such task, since the semantic and the source code may be built only through the information received from the smart object connected to the electronic device. Advantageously, an application program may be provided and sold with its corresponding smart object. Security means or measures, such as secure keys, for example, are provided only in the smart object, so that when the program is installed on a device only the corresponding smart object may allow the execution of the task in the device. Preferably, such security measures are uniquely associated to the electronic device, such as a unique serial number of the hardware of the electronic device, for example, or more preferably, to a MAC code of the microprocessor or a MAC code of the network drive of such an electronic device.

Without limiting the scope of the present embodiments, the application program may be, for example, a java application and the information includes one or more class names and/or one or more method names and/or one or more parameters for representing one or more objects implementing the task. The java application may comprise source or program codes associated to the task. The source or program codes may be syntactically correct to be compiled and executed with the java application, and semantically incorrect or incomplete to avoid an execution of the task before receiving the information from the smart object.

The application program may be in another programming language as will be apparent from the following specification. Advantageously, an inspection of the source or program codes associated to the task in the application program does not provide any information of a meaning or behavior or semantic of the task. An inspection cannot collect data for executing the task or copying it since the semantic of the task is not stored and cannot be reverse engineered in the electronic device. It may be defined only at run time with the information returned by the smart object for performing the task, when the task is recalled.

In another aspect, the incomplete semantic allows a limited execution of the task before receiving the information from the smart object. The limited execution may comprise displaying an inactive icon corresponding to the task on a user interface or display of the electronic device. The information received from the smart object may be processed by the application program to activate the icon for execution of the associated task. Advantageously, a user may understand the function of the task when executing the application program since the inactive icons graphically represents the function and the task. The task cannot be executed unless the smart object corresponding to the application program is functionally inserted and coupled to the electronic device for returning the information.

In yet another aspect, the task may be associated with one or more atomic or elementary components stored in the application program, and the application program defines the semantic of the task based on data packets received from the smart object. The data packets may include information on the elementary components necessary to define the task. For example, the task may be an operation, for instance "sum", and the elementary components may be a name of a class required to make the sum, a name of a method for executing the sum and a number of parameters, i.e., 2 parameters, required to execute the sum. The class and the method may be stored in the application program but their name is the information returned by the smart object at run time.

In one embodiment, the application program may include a hook module for communicating with a reader of the smart object. The smart object may comprise a smart object module for generating the data packets associated to the elementary components.

For defining the semantic of the task, the hook module may send a query to the smart object module for retrieving the elementary components associated with the task. The smart object module may transmit the data packet for the elementary components to the application program. Preferably, an Application Protocol Data Unit (APDU) command may be used for transmitting the query to the smart card object and for transmitting the data packet to the application program. More preferably, the APDU command may be in a TLV format. The query and the data packets may be encrypted for protecting the information during transmittal from and to the smart object.

The problem described above is also addressed by an electronic device protecting an application program and providing at least one task in an electronic device, characterized by comprising means or circuitry for retrieving information necessary for executing the task in the electronic device from a smart object connected thereto. This may be, for example, from an IC Card or SIM card. The circuitry requesting the information is at run time execution of the application program in the electronic device, and receives the information to define at run time a correct semantic of the task. The information preferably includes one or more class names and/or one or more method names and/or one or more parameters for representing one or more objects implementing the task. The application program may comprise source or program codes associated to the task. The source code may be syntactically correct, compiled and executed in the electronic device with the java application, and semantically incorrect or incomplete to avoid an execution or a complete execution of the task before receiving the information from the smart object.

The problem may also be addressed by a smart object for protecting an application program to be executed in an electronic device and providing at least one task. A memory in the electronic device may store information necessary for executing the task in a processor coupled to the memory in the electronic device, and for receiving a request for information. Information is transmitted to the application program at run time execution of the application program in the electronic device. This is to define at run time a correct semantic of the task in the electronic device.

Further advantages and features of the method, smart object and electronic device will be apparent from the description given here below only for example purposes and without limiting the scope of protection.

DETAILED DESCRIPTION OF THE PREFERRED EMBODIMENTS

Figure 1A:
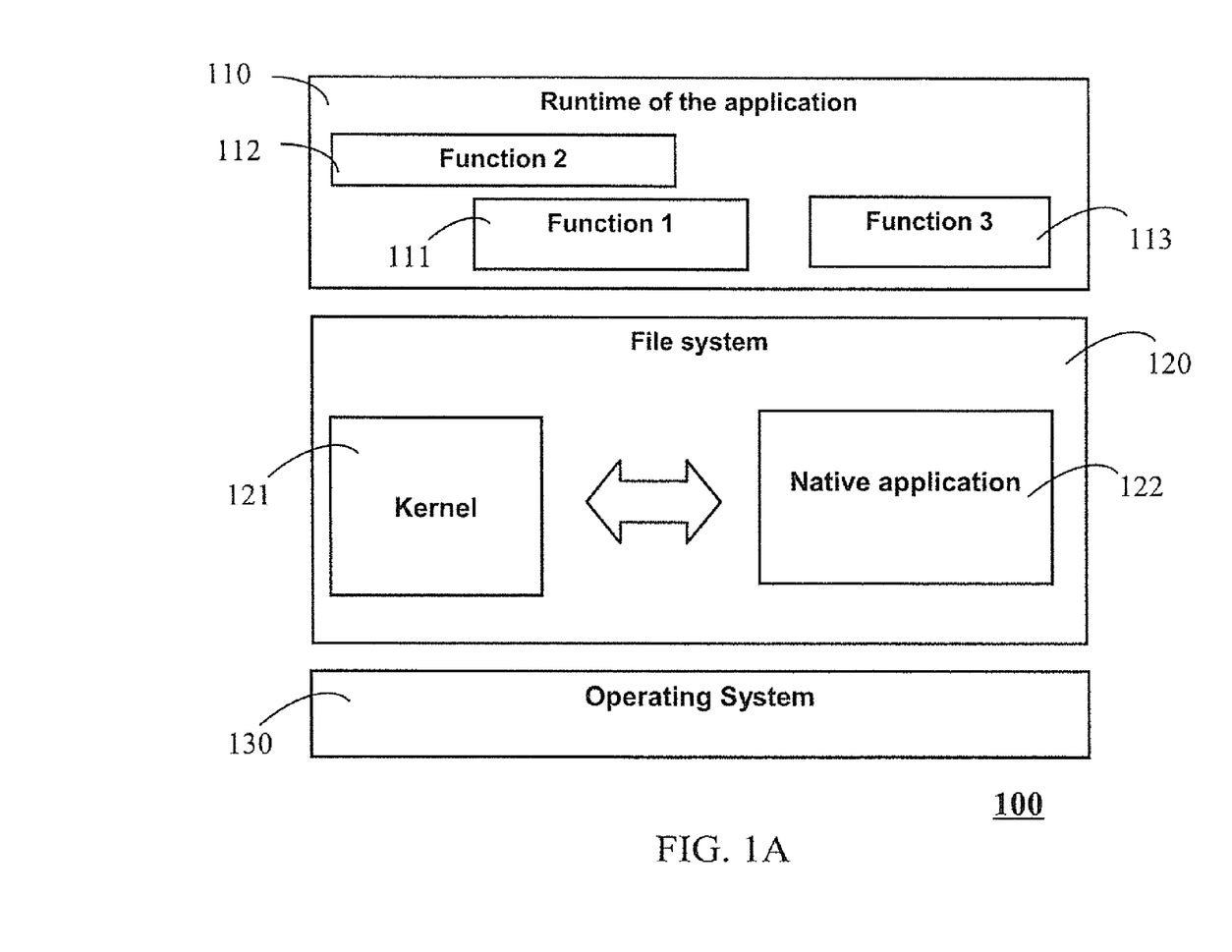
FIG. 1A schematically represents a method for protecting an application program according to the present invention.

The accompanying drawings, which are included to provide further understanding of the disclosure, illustrate embodiments of the disclosure and together with the description explain the principle of the disclosure. FIG. 1A schematically represents, in a block diagram, an environment for executing an application program in an electronic device.

A run time of the application 110 comprises a first function 111, a second function 112 and a third function 113 of the application program. A file system 120 on which the run time of the application 110 is executed comprises a Kernel 121 and a native application 122. A memory stores the application program, and a processor coupled thereto executes the application program.

Figure 1B:
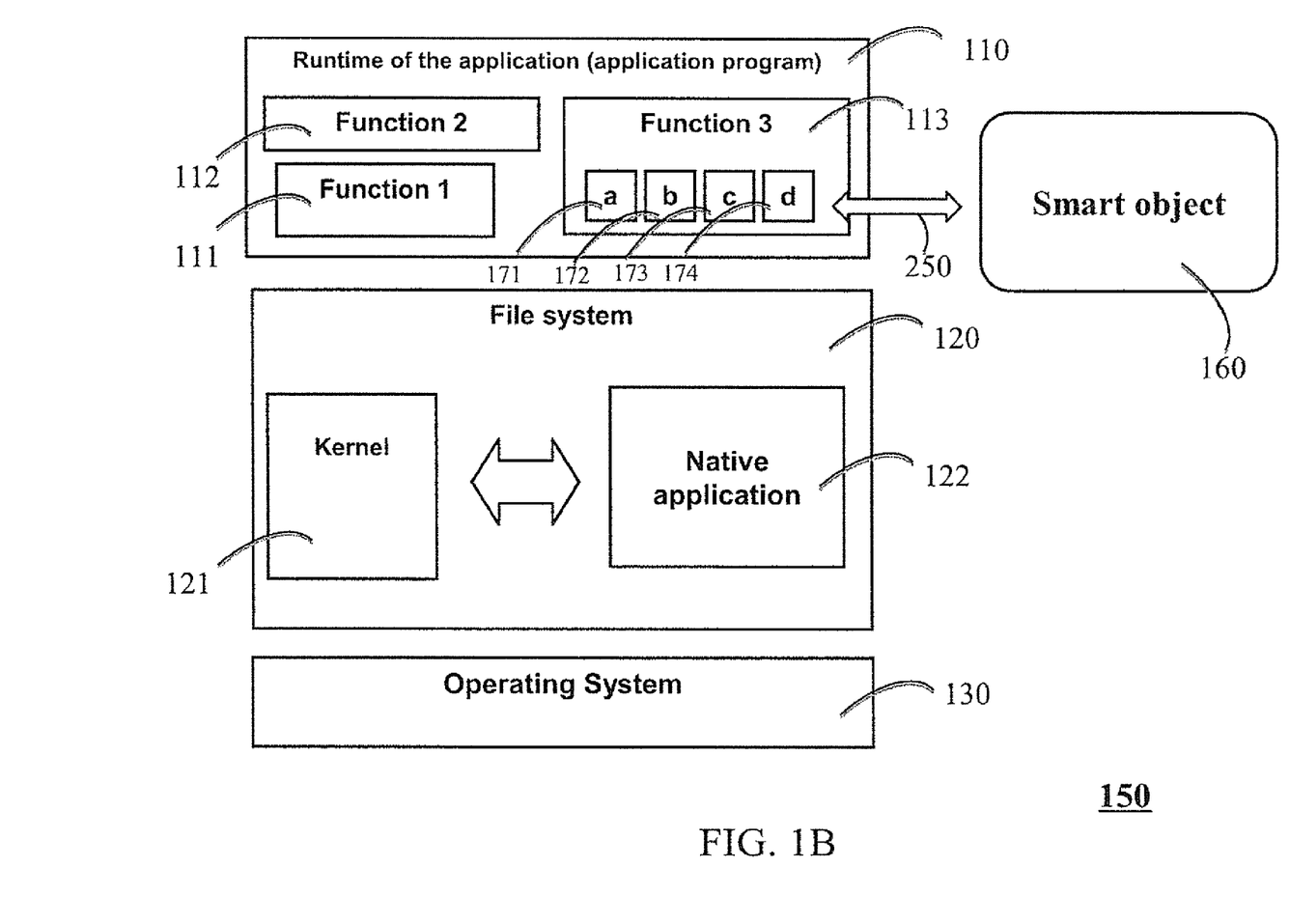
FIG. 1B schematically represents in greater detail the method of FIG. 1A.

FIG. 1B schematically represents in greater detail the environment for executing the application program of FIG. 1A. The application program 110 is loaded into the memory of the electronic device and a number of functions or tasks 111, 112, 113 are available for execution by the processor. At least one of these functions, i.e., function 113, is associated with atomic or elementary components 171, 172, 173, 174, i.e., elementary component 'a' 171, elementary component 'b' 172, elementary component 'c' 173 and elementary component 'd' 174. The elementary components 171, 172, 173, 174 are necessary for definition of a semantic or behavior of the third function 113, but they do not define such a semantic as they are stored in the electronic device.

The semantic or behavior of the function 3 is not defined at compile time of the application program, but dynamically at the run time of the application program. This is based on data packets 250 requested to and received from a smart object 160 connected to the electronic device. The smart object, for example, may be a SIM card or a smart card or an IC Card. In other words, the elementary components are not built together inside the application program to define the semantic of the task or function 3 until the smart object or smart card object 230 returns information mandatory to define such a semantic with the elementary components. This information is returned only at run time of the application program if connection with the smart object is available.

More particularly, the application environment requires the elementary components necessary for the creation of functions 111, 112, 113 of a smart object module 230 which is included in the smart object 160. The application program 110 and the SIM card 160 communicate for exchanging data packets 250.

The application program 110 provides a task or function 113 in the electronic device, and information 250 necessary for the processor to execute the task in the electronic device is stored in the smart object 160 connected thereto. The information 250 is requested to the smart object 160 at run time execution of the application program 110 in the electronic device, and defines at run time a correct semantic of the task.

With reference to the environment represented in FIG. 15, the application program 110 may be a java application and the information 250 includes one or more class names and/or one or more method names and/or one or more parameters for representing one or more objects implementing the task 113. The java application 110 comprises source or program codes associated to the task 113. The source or program codes are syntactically correct to be compiled and executed with the java application 110, and semantically incorrect or incomplete to avoid or prevent an execution of the task 113 before receiving the information 250 from the smart object 160. Such source or program codes include the elementary components that are built together for defining the task. The information 250 is used to specify the elementary components necessary to implement the task 113 and to execute it at run time of the application program 110, and how such components are recalled.

Figure 2:
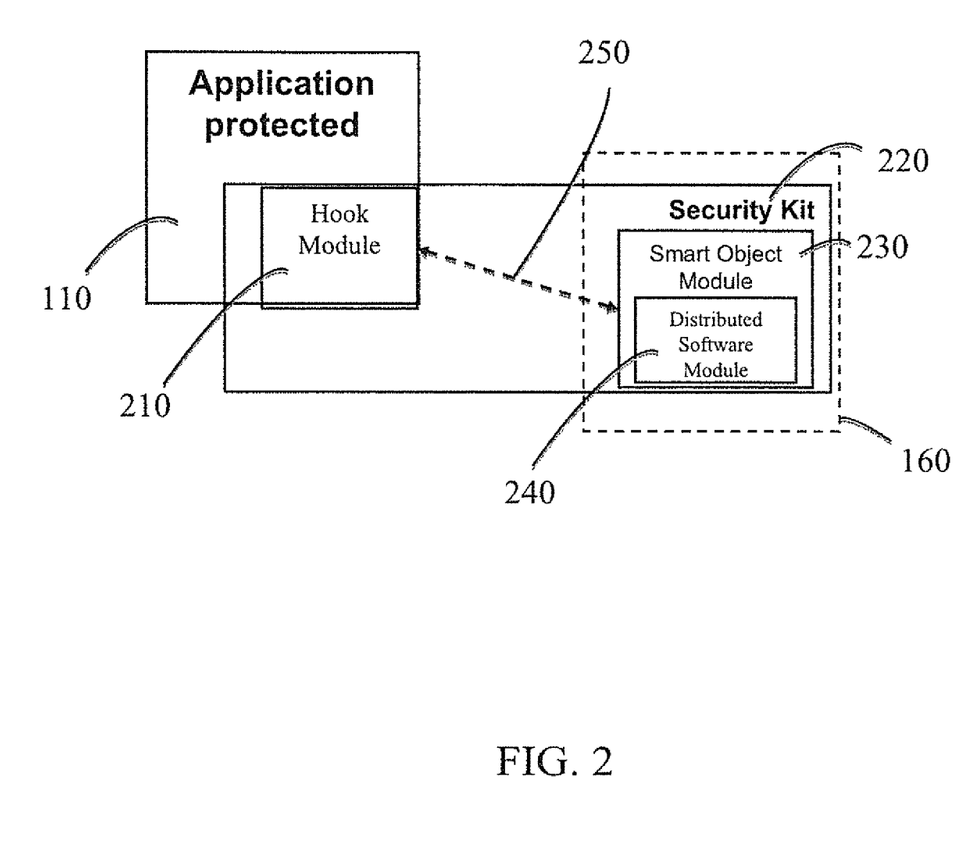
FIG. 2 schematically represents a transmission between a module of an application to be protected in a device and a module of a smart object for protecting the application according to the present invention.

FIG. 2 schematically represents communications between a module implementing protection in the electronic device and a module implementing protection in the smart object. The two modules together provide a method of protection.

The smart object 160 comprises a smart object module 230 which stores the information to be transmitted for identifying the elementary components 171, 172, 173, 174 for the definition of the task. The application program 110 comprises a hook module 210, and the smart object module 230 comprises a distributed software module 240. In one embodiment, a security kit 220 is provided to application developers, including the hook module 210 and the distributed software module 240 as a software development kit (SDK).

More particularly, at run time, the application program encounters one or more hooks and, for each hook encountered, queries the smart object to retrieve the information necessary to define the function or task to be defined and executed in the electronic device. For example, such information is a name of an object to be represented, a name of a method to be executed in such an object and a sequence of operations to be executed on the represented object.

The hook module 210 and the distributed software module 240 communicate for exchanging data packets 250, preferably using an Application Protocol Data Unit (APDU) defined in a SIM specification. APDU commands comprise three fields including a tag, a length, and a value. The length field may indicate the length of the value.

Preferably, the application program is written in a language supporting "reflection". Without limiting the scope of the embodiments on a specific programming language, languages supporting reflection are Forth, Lisp and some specific implementation of Lisp, for instance Scheme, .NET, Common Language Run time Objective C, Perl, Python, PHP, Ruby, Maude Smalltalk Lua, and any of such languages may advantageously be used to write the application program. Reflection allows an executing Java program to examine or "introspect" itself and manage internal properties of the application program. For example, reflection on a class may return names of all members of the class. Advantageously, examining and managing a class is implemented as a basic feature of a language supporting reflection. However, the method is not limited to languages supporting reflection. For instance, an API may be provided as a part of a security kit.

The hook module 210 integrates a plug-in for the communicating with a smart card reader (not represented) in which the smart object 160 is inserted. The distributed software module may be an applet.

Figure 3:
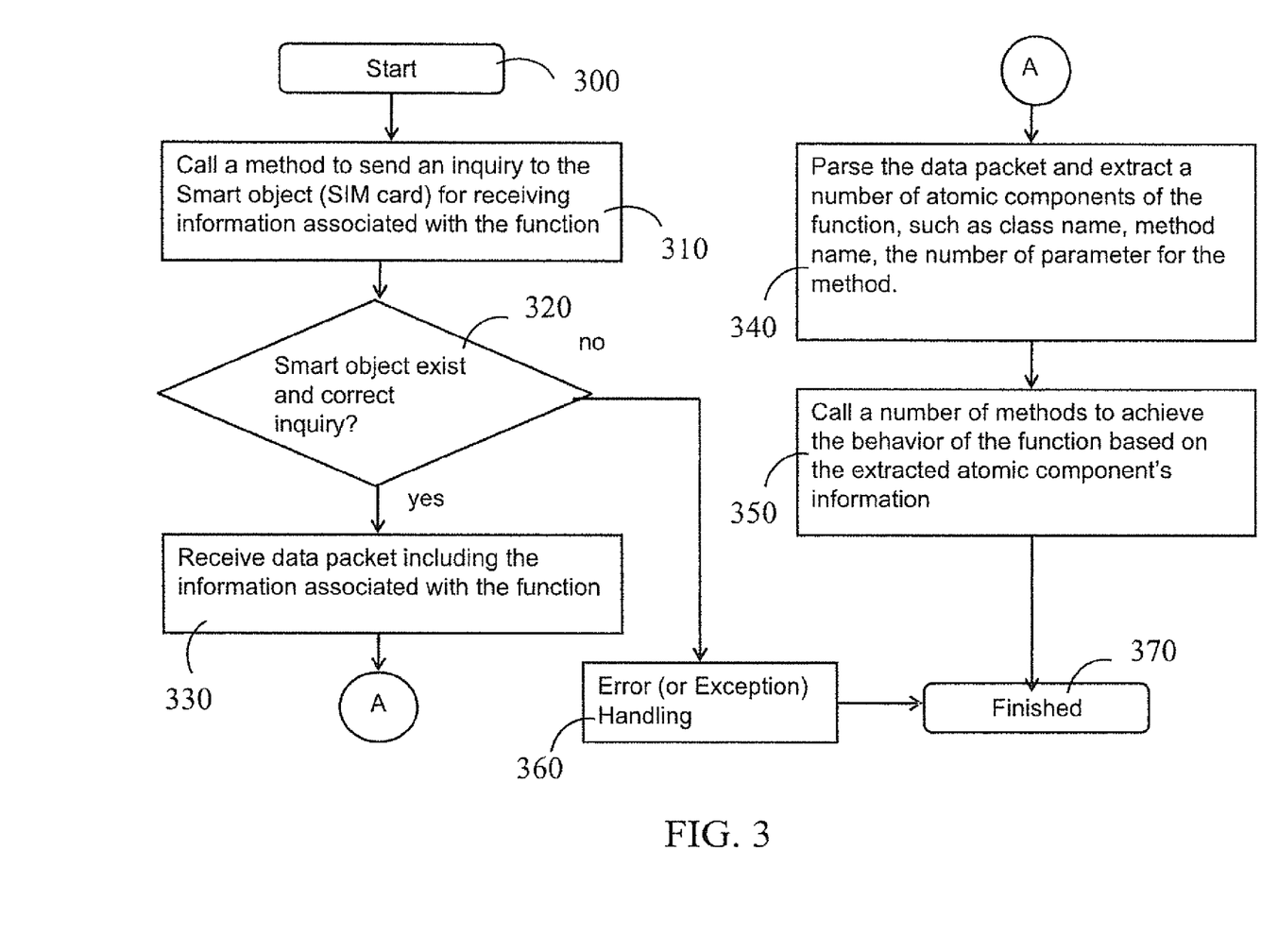
FIG. 3 is a flow diagram representing an execution of functions according to the present invention.

FIG. 3 is a flow diagram representing the sequence of execution of a function according to the method of the embodiments. The flow begins at step 300. During execution, the application program 110 sends a query to the smart object 160 for receiving information associated with the function 113 or task to be executed. The information associated with the function 113 may be a class name, a method name, or a maximum number of instances of the class.

The hook module 210 checks whether the smart object 160 is inserted in the card reader and whether the query is correct at step 320. If not correct, an exception or error is handled at step 360 and the execution for the function 113 is ended. The hook module 210 and the smart object 230 communicate to verify if the query is correct. The query for retrieving the elementary components 171, 172, 173, 174 is preferably encrypted with a secret key. Furthermore, data packets 250 for the elementary components are preferably encrypted by an encryption key stored in the smart object. In one embodiment, the encryption key is associated to a unique number identifying the electronic device in which the application program is stored and is set when the application program is installed in the electronic device. The unique number is, for example, the MAC address of a microprocessor of the electronic device or the MAC address of a network adapter of such a device.

If the check of step 320 succeeds, the hook module 210 receives data packet 250 including the information associated with the function 113 and transmits the information to the application program 110. At step 340, the application program 110 parses the data packets 250 and extracts a number of elementary components 171, 172, 173, 174 of the function 113, such as class name, a method name in such a class, and the number of parameters for such a method. In an alternative example, the hook module 210 parses the data and hands over the parsed data to the application program 110.

The application program 110, based on the extracted elementary component's information 171, 172, 173, 174, defines the function 113 and thus semantic. Such a definition of the function 113 is, for example, made through a "definition function" inside the application program itself, and taking in input information on the elementary component 171, 172, 173, 174 received from the smart object.

Figure 4A:
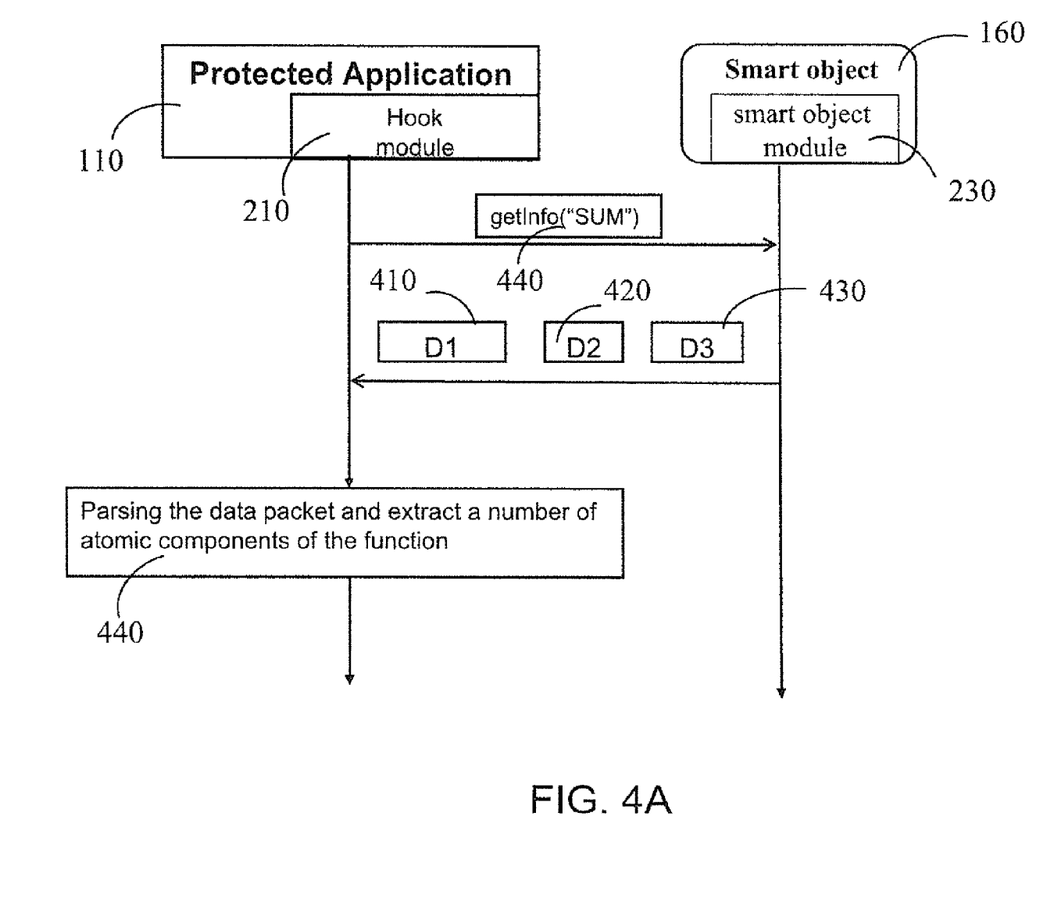
FIG. 4A schematically represents communications between the application program and the smart object module of FIG. 2.

Such definition functions include a function for creating a new instance of a class having a class name associated with the function or task 113. Such a name is received from the smart object, and a function for retrieving an object associated with a method and a function for handing over a number of parameters through the object is associated with such a method. FIG. 4A schematically shows an example of execution according to one embodiment.

During execution, the application program 110 calls a function 113 "SUM". The application program 110 does not include a specific definition or semantic for "SUM" and calls a method "getInfo" with the parameter name or identifier of the undefined function "SUM", i.e., getInfo("SUM").

The Hook module 210 sends a query through the communication line or interface connected to the card reader or via a radio interface. The smart object 160 inserted in the card reader receives the data packets and the smart object module 230 in the smart object 160 processes the query.

The smart object module 230 sends corresponding data packets 410 420, 430 including information associated to the function or task 113, and more particularly, information regarding the elementary components associated with the function "SUM".

The application program 110 or the hook module 210 receives and parses the data packets 410, 420, 430 and extracts the information used to define the function or task, i.e., a number of elementary components to be given in input to a definition function of the application program, which is already in execution and waiting for such information inside the application program. Such communications between a smart object and an application program is preferably implemented with hooks.

The first data packet 410, the second data packet 420 and the third data packet 430 are preferably APDU commands in the TLV format, i.e., tag, length, value. The tag field and the length field have a one byte length. The value field has a variable length associated to the "length field."

The first data packet 410 is, for example, "010A53756D6D61746F7279". Byte 01 is the tag of the packet. For instance, TAG 01 indicates that the following bytes is a hexadecimal encoding of ASCII characters associated to "the name of a class" that should be represented from the application program 110 through the definition function. In this example, the length field (second byte) is 0A and the value field is 53756D6D61746F7279, corresponding to the name of a class "Summatory" to be given in input to the function definition for defining a class and a corresponding semantic for "SUM".

The second data packet 420 is, for example, "020102". The TAG "02" is associated to a number of function parameters. The value field is, for example, "02", so that the number of parameters to be given in input to the function definition is 2. This gives further information for the definition of the semantic for "SUM".

The third data packet 430 is "0303416464". The TAG=03, for example, indicates that what follows is the hexadecimal encoding in the ASCII characters corresponding to "a name of a method" that is called from the application program 110. In this case, the length field (second byte) is 03 and the value is 416464, which is "Add". Thus, the method name is "Add" and completes the semantic for the "SUM".

Figure 4B:
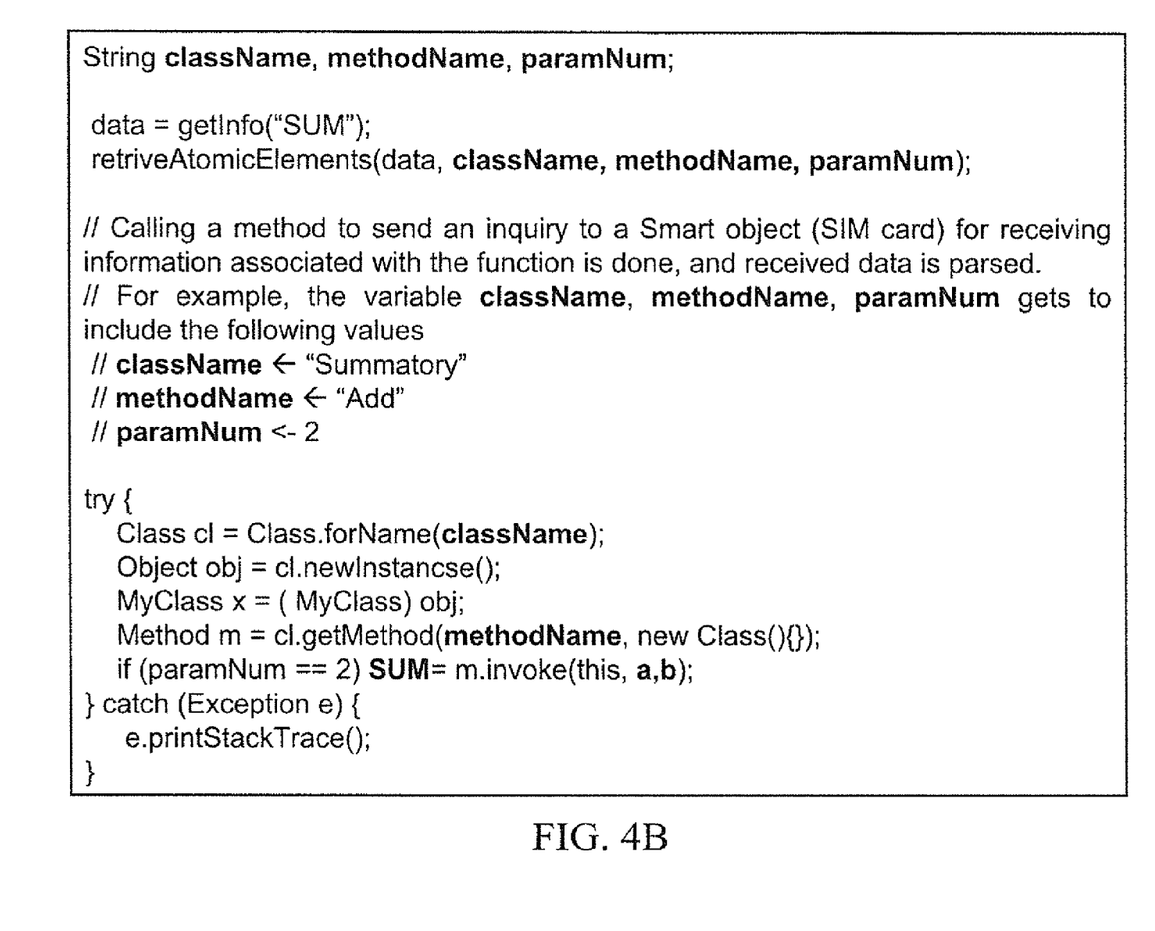
FIG. 4B represents in a pseudo code language an embodiment of the present invention.

FIG. 4B is a pseudo Java source code of the function 113 execution of FIG. 4A according to one embodiment. A variable "className" stores the className for the function "Sum" that, with reference to the example given above, is defined as "Summatory" at run time, in the application program. The variable "method Name" stores the method name of the class for the function "Sum" and it is defined as "Add", at run time. The variable "paramNum" stores the parameter number of the method "Add" and is defined in 2. These values of variables have been retrieved by calling the function getInfo("SUM") and "retriveAtomicElements." More particularly, "retriveAtomicElements" parses the data packet 250 and stores values to corresponding variables which are provided as a parameter thereof.

After receiving the information from the smart card, the application program can retrieve a specific class instance by calling the method "Class.forName" with the parameter "className." Using Java language, and reflection, the class object, class instance, and method object can be retrieved by their name at run time dynamically. With a language not supporting reflection, an API (Application Programming Interface) may be implemented to work as a java reflection.

The method name for the atomic component is retrieved by calling "getMethod", a method of object class, with parameters "methodName." After checking the number of parameters having been provided by the hook module 210, the method "Add" of class "Summatory" can be called by the method "m.invoke(this, a,b)".

As shown above, the application program compiled does not include the information such as "Summatory", "Add", the number of parameters required for "Add", etc. Thus, a hacker cannot detect the operation performed in this application program by reverse engineering, and an unauthorized use or copy of the application program is prevented. Furthermore, since the data packets exchanged between the hook module and the smart object are encrypted, an attacker cannot exploit the packets for detecting specific information for the function or task.

Advantageously, the security of the application program is managed inside the smart object since the application program cannot execute the task whether the smart object is not connected to the electronic device or whether the information required for the execution of the task is not transmitted.

The invention claimed is:

1. A method for protecting an application program performing a task in an electronic device, the method comprising:
   storing information for executing the task in the electronic device in a smart object coupled thereto; and
   providing a request for the information to the smart object at a run time execution of the application program in the electronic device, and returning the information to the application program to define at the run time a correct description of the task;
   with the application program comprising codes associated with the task, with the codes that are correctly described being compiled and executed with the application program after receiving the information from the smart object, and with the codes that are incorrectly or incompletely described not being executed with the application program before receiving the information from the smart object;
   the incomplete description allowing a limited execution of the task before receiving the information from the smart object, with the limited execution comprising displaying an inactive icon corresponding to the task on a user interface of the electronic device, and with the application program processing the information received from the smart object for activating the icon for execution of the task.

2. The method according to claim 1, wherein the information includes at least one of a class name, a method name and a parameter for representing at least one object implementing the task.

3. The method according to claim 1, wherein the smart object is configured as at least one of an IC Card and a SIM card.

4. The method according to claim 1, wherein the task is associated with at least one elementary component to be used for defining the description of the task in the electronic device, with the at least one elementary component being included in data packets received from the smart object.

5. The method according to claim 4, wherein the application program comprises a module for communicating with a reader of the smart object, with the smart object comprising a smart object module storing the information for generating the data packets.

6. The method according to claim 4, wherein defining the description of the task comprises:
   transmitting a query from the module in the electronic device to the smart object module for identifying the at least one elementary component associated with the task; and
   receiving the data packets for the at least one elementary component from the smart object module.

7. The method according to claim 6, wherein an Application Protocol Data Unit (APDU) command is used for transmitting the query to the smart card object and for transmitting the data packets to the application program.

8. The method according to claim 7, wherein the APDU command comprises a tag field, a length field and a value field, with the length field indicating a length of the value field.

9. The method according to claim 6, wherein the query and the data packets are encrypted.

10. An electronic device comprising:
    a processor and a memory coupled thereto and configured to implement an application program to
    retrieve information to execute a task from a smart object when coupled thereto,
    provide a request for the information to the smart object at a run time execution of the application program, and
    receive the information to define at the run time a correct description of the task;
    with the application program comprising codes associated with the task, with the codes that are correctly described being compiled and executed with the application program after receiving the information from the smart object, and with the codes that are incorrectly or incompletely described not being executed with the application program before receiving the information from the smart object;
    a user interface coupled to said processor and to said memory, with the incomplete description allowing a limited execution of the task before receiving the information from the smart object, with the limited execution configured to display an inactive icon corresponding to the task on said user interface, and with the application program processing the information received from the smart object for activating the icon for execution of the task.

11. The electronic device according to claim 10, wherein the information includes at least one of a class name, a method name and a parameter to represent at least one object implementing the task.

12. The electronic device according to claim 10, wherein the smart object is configured as at least one of an IC Card and a SIM card.

13. The electronic device according to claim 10, wherein the task is associated with at least one elementary component to be used for defining the description of the task in the electronic device, with the at least one elementary component being included in data packets received from the smart object.

14. The electronic device according to claim 13, wherein the application program comprises a module for communicating with a reader of the smart object, and with the smart object comprising a smart object module storing the information for generating the data packets.

15. The electronic device according to claim 13, wherein the application program is configured to define the description of the task by transmitting a query from said module to the smart object module to identify the at least one elementary component associated with the task, and receiving the data packets for the at least one elementary component from the smart object module.

16. The electronic device according to claim 15, further comprising an Application Protocol Data Unit (APDU) command to transmit the query to the smart card object and to transmit the data packets to the application program.

17. The electronic device according to claim 16, wherein said APDU command comprises a tag field, a length field and a value field, with the length field indicating a length of the value field.

18. The electronic device according to claim 16, wherein the query and the data packets are encrypted.

19. A smart object comprising:
    a processor and a smart object module coupled thereto and configured to protect an application program to perform at least one task when executed in an electronic device, with said smart object module being configured to store information to execute the task in the electronic device; and an interface coupled to said smart object module and configured to receive a request for the information from the application program in the electronic device and to transmit the information to the application program at a run time execution of the application program to define at the run time a correct description of the task;

with the application program comprising codes associated with the task, with the codes that are correctly described being compiled and executed with the application program after receiving the information from the smart object module, and with the codes that are incorrectly or incompletely described not being executed with the application program before receiving the information from said smart object module;

with the incomplete description allowing a limited execution of the task before receiving the information from the smart object module, with the limited execution configured to display an inactive icon corresponding to the task on said interface, and with the application program processing the information received from the smart object module for activating the icon for execution of the task.

20. The smart object according to claim 19, wherein the information includes at least one of a class name, a method name and a parameter to represent at least one object implementing the task.

21. The smart object according to claim 19, wherein the query and the data packets are encrypted.

22. The smart object according to claim 19, wherein said smart object module is configured so that the smart object is at least one of an IC Card and a SIM card.

23. The smart object according to claim 19, wherein said smart object module being configured to generate data packets, with the task being associated with at least one elementary component to be used for defining the description of the task, and with the at least one elementary component being included in the data packets.

24. The smart object according to claim 23, wherein said smart object module is configured to receive a query from the application program to define the description of the task for identifying the at least one elementary component associated with the task.

25. The smart object according to claim 24, wherein said APDU command comprises a tag field, a length field and a value field, with the length field indicating a length of the value field.

26. The smart object according to claim 23, further comprising an Application Protocol Data Unit (APDU) command for transmitting the data packets to the application program.

* * * * *